July 3, 1928.

H. C. BURDT 1,675,877

LIGHT

Filed May 17, 1926

Hugo C. Burdt
INVENTOR.

BY *Henry Blech*

ATTORNEYS.

Patented July 3, 1928.

1,675,877

UNITED STATES PATENT OFFICE.

HUGO C. BURDT, OF CHICAGO, ILLINOIS.

LIGHT.

Application filed May 17, 1926. Serial No. 109,525.

The invention relates to lights and has for its principal object to obviate the glare thereof.

A further object aims at providing a light, which is freed from glare without lessening, however, the illuminative effect thereof.

A still further object aims at providing a device which may be applied to lights so as to remove the glare.

It is also an object of the invention to provide such a device which is inexpensive to produce and may be easily applied in functional position.

With these and other objects in view which will become apparent upon perusal of the description, the invention comprises the means described in the following specification, particularly pointed out in the claim forming a part thereof, and illustrated in the drawing, in which:

Figure 1:
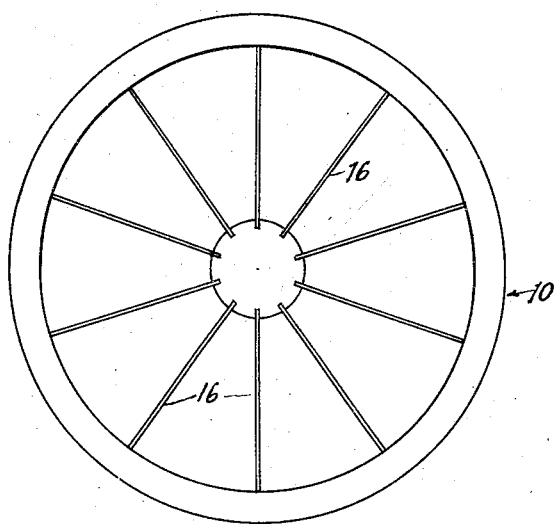
Figure 1 is a front view of a light to which my invention is applied.
Figure 2:
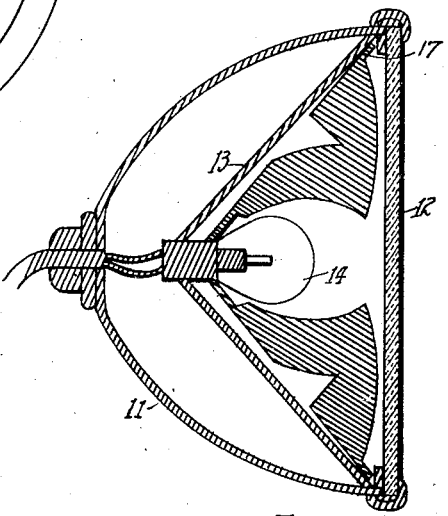
Figure 2 is a section through the light.
Figure 3:
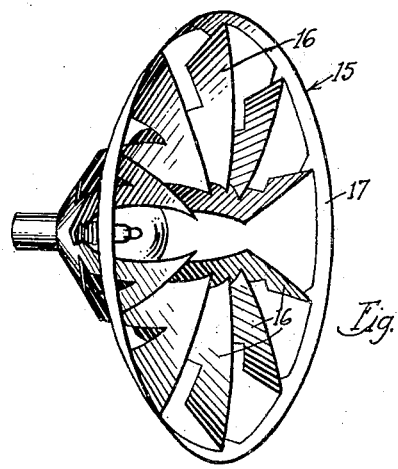
Figure 3 is a perspective view of the device embodying my invention.

The invention has been illustrated in connection with the headlight of an automobile, but it is understood that it may be applied to any light where it is desirable to remove the glare.

Referring to the drawing, 10 generally designates a light which in the embodiment shown comprises a casing 11 open at the front and closed by a circular glass disk 12. Interiorly of the casing is a reflector 13 which at its center surrounds a source of illumination such as an electric bulb 14.

Between the reflector 13 and the glass disk 12 a device generally designated by 15 is arranged which comprises a plurality of blades or fins 16 joined at the outer end by a ring 17, which may be secured to the fins or formed integral therewith. The fins extend in radial direction and are so proportioned that the forward and inner end is slightly within the circle defined by the bulb. The shape of the fins is chosen with a view of obtaining the greatest efficiency.

The operation of the device is as follows:

The fins occupying radial planes in the light casing will not ordinarily interfere with proper illumination. To a person approaching the light and viewing the same under an angle a portion of the reflector surface will be hidden by the projection of the fin planes onto the reflector. Consequently the full effect of reflection is not obtained by the person and there is no glare.

At great distance the headlight shown will not differ in effect from any ordinary headlight. Upon approach, however, the driver will not be disturbed by the glare as he views the reflector under an angle and portions thereof are covered by the fins. The invention may be applied to any light wherever the glare is to be removed.

While the drawing shows a preferred embodiment of the invention numerous changes and alterations may be made within the purview of the invention. I, therefore, do not limit myself to the details of construction as shown, but wish to include all changes, modifications and alterations constituting departures within the scope of the invention as defined in the appended claim.

I claim:

In combination with a light, a reflector in the light, a lamp bulb having a socket at the center of the reflector, a truncated cone of thin metal arranged to lie within the reflector, the apex of said cone adapted to fit over the bulb socket and vanes substantially triangular in shape struck up from an intermediate section of the cone and bent inwardly to extend radially about the bulb, and an annular section remaining at each end of the truncated cone to support the ends of the vanes.

In witness whereof I affix my signature.

HUGO C. BURDT.